UNITED STATES PATENT OFFICE.

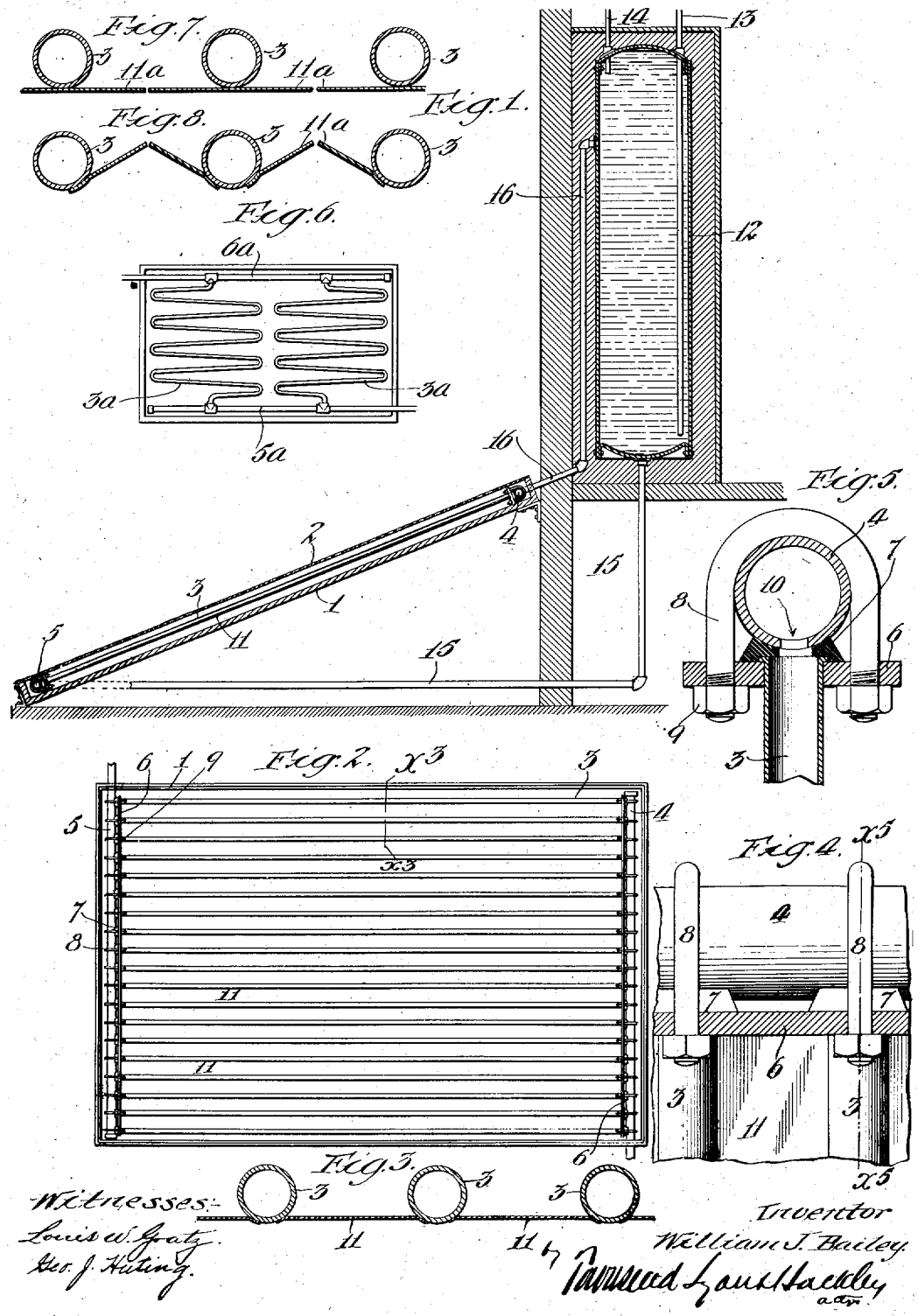

WILLIAM J. BAILEY, OF MONROVIA, CALIFORNIA.

SOLAR HEATER.

966,070.   Specification of Letters Patent.   Patented Aug. 2, 1910.

Application filed April 19, 1909. Serial No. 490,954.

*To all whom it may concern:*

Be it known that I WILLIAM J. BAILEY, a citizen of the United States, residing at Monrovia, in the county of Los Angeles and State of California, have invented a new and useful Solar Heater, of which the following is a specification.

This invention relates to solar heaters, and one object of the invention is to produce a device of this character which will heat the water to a hotter degree than has heretofore been accomplished by like devices, so far as I am aware.

A further object is to not only heat the water to a high degree but to also heat as large a quantity of water as possible in a given time.

A further important object is to retain the water in heated condition after it has been heated.

Briefly, my invention consists in causing the water to circulate through tubes having thin walls and of relatively small cross section and of extended length, the said tubes being exposed to the sun's rays. Heretofore water has been passed through chambers which were exposed to the sun's rays, but such chambers were of comparatively large capacity and held a large body of water and were not of an extended length, said chambers acting as both reservoir and heater. In my invention, the water while it is being heated is split up into small streams by small tubes of considerable length and the tubes are of a good heat conducting material, such as copper, so that the small streams of water confined in such tubes are quickly heated to a high degree. These tubes in my invention being purposely very small, do not act as reservoirs, but as heaters only.

A further detail of my invention consists in employing sheets or strips of heat conducting material arranged between the tubes and connected with the tubes so that a comparatively large expanse of a heat conducting metallic sheet material is subjected to the sun's rays, which sheet of heat conducting material serves to impart additional heat to the tubes by conducting the heat, which the said sheet receives, to the tubes; thereby augmenting the heat which the tubes receive from the direct rays of the sun.

My invention may be performed in various ways and in the drawings I have shown two forms.

Referring to the drawings: Figure 1 is a vertical cross section through one form of the invention. Fig. 2 is a plan view of the solar heater, the tank being removed. Fig. 3 is an enlarged cross section on line $x^3$—$x^3$ Fig. 2. Fig. 4 is a plan view in detail, partly in section, showing one method of attaching the tubes to a heater. Fig. 5 is a cross section on line $x^5$—$x^5$ Fig. 4. Fig. 6 is a plan view showing another form of heater. Fig. 7 is a view similar to Fig. 3, showing a slightly modified form of sheets. Fig. 8 is a view similar to Fig. 3, showing another form of sheets.

In one form of the invention 1 designates a box provided with a panel 2 for admitting the sun's rays to heat the interior of the box and for retaining the heat within the box. Within the box 1 is a series of water heating tubes 3 which have thin walls and are of relatively small cross section but of extended length. In actual practice I prefer to make these tubes of about half inch tubing, preferably of copper, as that material is one of the best of heat conducting materials. The tubes are connected in parallel to transverse headers 4 and 5 and communicate therewith. The tubes may be connected in communication with the headers in any desired manner, a preferred method being indicated in Figs. 4 and 5 wherein the tubes 3 pass through a strip 6, the tubes being slightly headed thereover, as indicated in Fig. 5, and a lead gasket 7 being interposed between the header 4 and each tube 3, the parts being clamped together by a U-clamp 8 the legs of which pass through the strip 6 and are secured by nuts 9. The headers 4 and 5 are provided with orifices 10 which communicate through the lead gasket 7 with the respective tubes 3. By making the tubes of very small cross sectional area, as stated, it is possible to split the body of water to be heated into a large number of small streams within a small compass, and as the walls of the tubes are thin and the streams of water are small, the water is very quickly heated by the hot walls of the copper tubes, the latter receiving the direct rays of the sun. The box is preferably disposed at an inclination so that the rays will strike the tubes at the most favorable angle, and in this form one of the headers is elevated so that water entering at the lower header, for instance, the header 5, will circulate upward through the tube 3 into the upper header 4.

In order to supply additional heat to the tubes 3 a series of copper strips 11 are arranged longitudinally of the tubes and between the tubes, as shown in Figs. 2 and 3, the edges of the strips 3 being soldered or otherwise secured to the tubes in such a manner that an intimate contact is obtained which promotes the conduction of heat from the strips 11 to the tubes. The strips 11 being of a good heat conducting material, such as copper, and of a comparatively great area which is exposed to the sun's rays, become highly heated thereby and the heat which this expansive copper sheet receives is directly imparted by conduction to the tubes 3, thereby imparting additional heat to the tubes 3. The tubes being of copper enable the tubes to be spaced apart and the thin sheets 11 placed between them to secure the requisite heat which is a much cheaper construction than it would be to use a greater number of tubes set close together.

12 indicates a tank which may be located in any desired position and surrounded by a heat insulating jacket, and provided with a supply pipe 13, preferably leading to the bottom of the tank, as shown, and with a pipe 14 through which heated water is drawn off from the tank. The lower end of the tank which contains the colder water is connected by a pipe 15 with the lower header 5. The upper header 4 is connected by a pipe 16 with the tank near its upper end so that the colder water from the lower part of the tank after being heated in the heater is supplied by the pipe 16 to the upper part of the tank, thereby producing a circulation of the water, and the hotter water in the tank is supplied as required for use by the pipe 14. The copper strips 11 are preferably secured to the lower walls of the tubes, as shown in Fig. 3, in order that the greater portion of each tube may lie above the copper strips and thus receive the greatest possible exposure to the sun.

Fig. 6 shows a modified form in which tubes 3ª are employed in place of the tubes 3, the tubes 3ª being bent back and forth, as shown, and connected at their lower ends to a header 5ª and at their upper ends to a header 6ª. Each leg of each tube is inclined upwardly, as clearly shown, to facilitate the circulation of water from the header 5ª to the header 6ª. It will be understood that in practice the inclination of the legs of the tubes need only be sufficient to produce the required circulation. In the drawing the inclination has been slightly exaggerated for illustrative purposes. In this form it will be noticed that the same effect is produced by reason of the small tubes of thin walls and extended length which receive the rays from the sun.

The heater shown in Fig. 6 may be connected with the tank by piping similar to that shown in Fig. 1.

Figs. 7 and 8 show slightly modified forms of sheets 11ª, the sheets not being continuous with each other. Fig. 8 shows the sheets arranged at an angle to secure a greater area of exposure.

What I claim is:

1. A solar heater comprising an inclosure with a transparent panel, a series of water heating tubes within said inclosure, said tubes being of relatively small cross sectional area, and, in aggregate, of extended length, and sheets of heat conducting material arranged between the tubes and intimately connected thereto and forming an extended surface exposed to the sun's rays for imparting additional heat to the tubes.

2. A solar heater comprising a series of copper tubes of extended length and of relatively small cross section, headers at the respective ends of the tubes in communication with the tubes, and sheets of copper between the respective tubes and in intimate contact with the tubes, said sheets being in heat absorbing relation to the sun's rays for imparting additional heat to the tubes.

3. A solar heater comprising a series of copper tubes of extended length and of relatively small cross section, headers at the respective ends of the tubes in communication with the tubes, and sheets of copper between the respective tubes and in intimate contact with the tubes, said copper sheets being secured to the tubes at the lower walls of the tubes.

4. A solar heater comprising a series of tubes of extended length and of relatively small cross section in communication with each other, the said tubes being spaced apart, and sheets of copper between the respective tubes and interrupted at the sun exposure side, whereby only the upper surface of the tube is presented to the sun's rays.

5. A solar heater comprising a series of tubes of extended length and of relatively small cross section in communication with each other, and sheets of copper connected with the bottom walls of the said tubes for conducting heat to the lower part of the tube in which the colder water is, said sheets being in heat absorbing relation to the sun's rays for imparting additional heat to the tubes.

In testimony whereof, I have hereunto set my hand at Los Angeles, California, this 13th day of April, 1909.

WILLIAM J. BAILEY.

In presence of—
G. T. HACKLEY,
FRANK L. A. GRAHAM.